United States Patent [19]
Hayes

[11] Patent Number: 5,855,321
[45] Date of Patent: Jan. 5, 1999

[54] DIE LUBRICANT NOZZLE ASSEMBLY

[76] Inventor: John W Hayes, 1660 C Hwy. 51 South, Hernando, Miss. 38632

[21] Appl. No.: 906,527

[22] Filed: Aug. 5, 1997

[51] Int. Cl.[6] ..................................................... B05B 17/04
[52] U.S. Cl. .................................. 239/11; 239/1; 239/99; 239/104; 239/391; 451/449
[58] Field of Search ............................... 239/86, 99, 104, 239/119, 11, 390, 391, 1; 451/449

[56] References Cited

U.S. PATENT DOCUMENTS

| | | | |
|---|---|---|---|
| 1,992,426 | 2/1935 | Herbsman et al. | 239/104 |
| 3,510,065 | 5/1970 | Gigantino et al. | 239/590 |
| 4,878,785 | 11/1989 | Heron et al. | 406/194 |
| 4,989,788 | 2/1991 | Bending et al. | 239/429 |
| 5,288,027 | 2/1994 | Herstek et al. | 239/594 |
| 5,531,085 | 7/1996 | Hayes | 72/43 |

OTHER PUBLICATIONS

Shamrock Engineering Company, *Slick Ideas!*(advertisement in Aug. 1996 Die Casting Management magazine).

J&A Engineering Inc., *HVS Spray Manifold* (date unknown).

Flex Spray division of Metric Tool and Die Corp., *Flex Spray Expandable Airless Spray Stock Lubrication Systems* (date unknown).

Flex Spray division of Metric Tool and Die Corp., *Magnetic Base Spray Assemblies* (date unknown).

Spraying Systems, Inc., *Unijet Spray Nozzle Tip* (date unknown).

Franklin Oil Corp., *F.A.S.T. Lube System* (date unknown).

A–S Mfg., Inc., *Tek–Spray, The Next Generation of Airless Spray Die Lubricant Application Systems* (date unknown).

Px Products, Inc., *How to Spot a Quality In–Die Lubrication System*, Metal Forming 1993, at 9 (advertisement).

*Primary Examiner*—Andres Kashnikow
*Assistant Examiner*—Steven J. Ganey
*Attorney, Agent, or Firm*—Walker, McKenzie & Walker, P.C.

[57] ABSTRACT

A combination of a die lubricant source, a feedtube, and a nozzle assembly, as well as a method of using the combination to cool and/or lubricate a die. The die lubricant source supplies a plurality of bursts of a metered amount of a die lubricant to a feedtube bore. The nozzle assembly includes a removable barrel having a barrel bore therethrough and a removable atomizing spray tip having a spray tip bore therethrough. A posterior end of the barrel bore communicates with the feedtube bore and an anterior end of the barrel bore communicates with the spray tip bore. The ratio of the cross-sectional area of the barrel bore divided by the cross-sectional area of the spray tip bore is not less than 2.5, and the cross-sectional area of the barrel bore is preferably not greater than the cross-sectional area of the feedtube bore. The nozzle assembly atomizes and delivers the plurality of bursts of the metered amount of the die lubricant so that substantially none of the die lubricant drips from the nozzle assembly following each one of the bursts of the metered amount of the die lubricant. The method includes using the spray nozzle so that a steam barrier, created by contact of a previous lubricant burst with the die, is allowed to dissipate before creating a successive burst of the metered amount of the die lubricant.

11 Claims, 2 Drawing Sheets

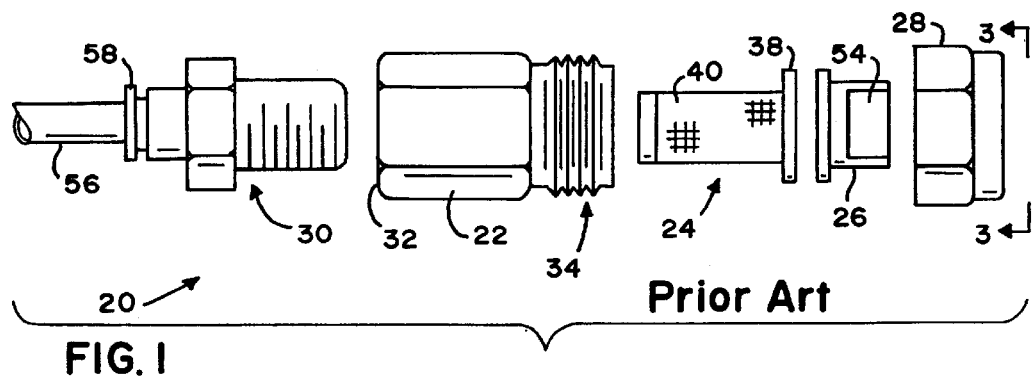
FIG. 1 Prior Art
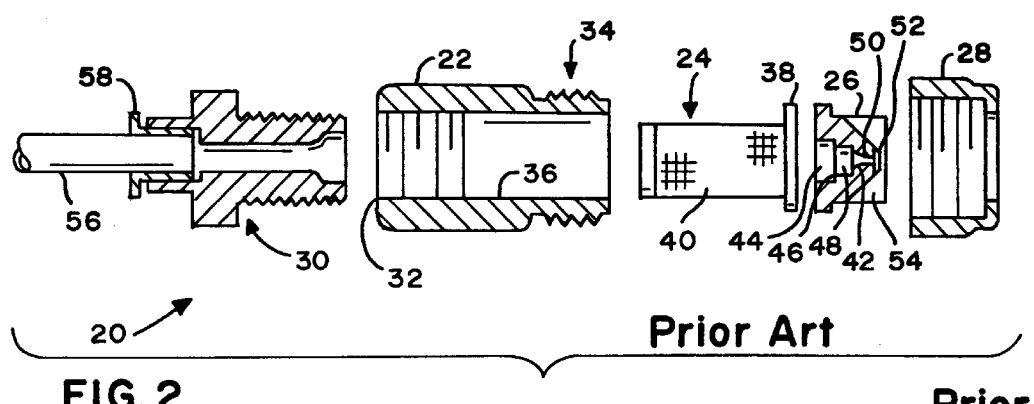
FIG. 2 Prior Art
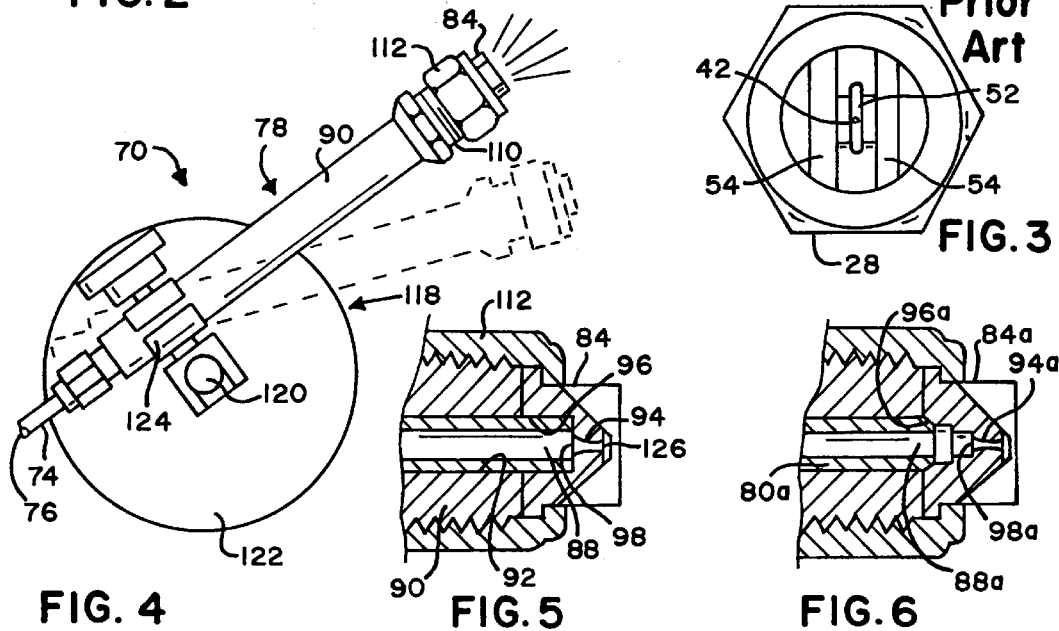
FIG. 3 Prior Art
FIG. 4
FIG. 5
FIG. 6

DIE LUBRICANT NOZZLE ASSEMBLY

BACKGROUND OF THE INVENTION

1. Field of the Invention

The present invention relates, in general, to a spray nozzle assembly, and in particular, to a die lubricant spray nozzle assembly which can be used to atomizingly spray a plurality of short bursts of a metered amount of die lubricant without substantial dripping.

2. Information Disclosure Statement

It is often desirable to apply a die lubricant to a die of a die press and/or to the workpiece being processed.

In many prior art air-driven die lubricant systems, the die lubricant is atomized by mixing compressed air with the die lubricant in an atomizing chamber, and the air and lubricant mixture is then directed through a spray tip, on a continuous-feed basis, to the die and/or the workpiece. A large volume of compressed air, having a high velocity, is typically used in the prior art to atomize the die lubricant into fine particles. Because the velocity of the air and die lubricant mixture is so great as it passes through the spray tip and contacts the die, a large volume of the die lubricant typically bounces off of the die and the workpiece. This causes inefficient utilization of the die lubricant, and the accumulation of this reflected die lubricant in the work area causes an environmental and safety hazard. Additionally, a large percentage of dies operate in excess of 500 degrees Fahrenheit (260 degrees Celsius), and it has been experimentally found that when die lubricant contacts a die operating in excess of 500 degrees Fahrenheit (260 degrees Celsius), a steam barrier is generated that acts to repel the die lubricant from the die and the lubricated workpiece. The velocity of the die lubricant must therefore be increased in order to penetrate this steam barrier, and this increased velocity causes a still-greater volume of die lubricant to bounce off of the die and workpiece. The result is an increased inefficiency in the utilization of the die lubricant and an increased environmental and safety hazard in the work area.

Even when airless prior art nozzle assemblies are used to atomize bursts of die lubricant, they do not atomize the die lubricant to the extent desired and produce lubricant drip following each short burst of a metered amount of the die lubricant. Similar to the effect observed with air-driven prior art nozzle assemblies, a steam barrier is generated when the die lubricant contacts a die operating in excess of 500 degrees Fahrenheit (260 degrees Celsius), thereby creating a problem of repulsion of the next short burst of the metered amount of die lubricant.

It is therefore desirable to have a lubricant driven system having an improved die lubricant spray nozzle assembly that can deliver a plurality of short bursts of a precisely metered amount of die lubricant while substantially eliminating the problem of die lubricant drip following each one of the bursts, and that can also provide significant atoniization of the die lubricant as it exits the nozzle assembly. It is also desirable to have a method of using the nozzle assembly which will eliminate the problem of die lubricant repulsion associated with the creation of a steam barrier.

A preliminary patentability search in Class 239 subclasses 533.1, 568, 575, 590, 597, 598, and 599 and in Class 164 subclass 72, produced the following patents, some of which may be relevant to the present invention: Gigantino et al., U.S. Pat. No. 3,510,065, issued May 5, 1970; Heron et al., U.S. Pat. No. 4,878,785, issued Nov. 7, 1989; Bendig et al., U.S. Pat. No. 4,989,788, issued Feb. 5, 1991; and Herstek et al., U.S. Pat. No. 5,288,027, issued Feb. 22, 1994. Gigantino et al. discloses a nozzle having a non-atomizing spray tip that is designed to deliver a continuous spray of water having a high pressure, 1800 to 3000 pounds per square inch, at a high velocity. Heron et al. discloses a nozzle that is designed to continuously deliver an abrasive fluid at a high velocity and to direct the abrasive fluid towards the center of an internal cross-sectional area of the nozzle in order to reduce wear of the internal cross-sectional area, and the nozzle is designed to have an elongated non-atomizing spray tip.

The inventor is also aware of the following related reference that may be relevant to the present invention: Hayes, U.S. Pat. No. 5,531,085, issued Jul. 2, 1996, which describes a die lubricant applicator for delivering precisely metered bursts of die lubricant.

None of these references, either singly or in combination, disclose or suggest the present invention.

BRIEF SUMMARY OF THE INVENTION

The present invention comprises a combination of a die lubricant source, a feedtube, and a nozzle assembly, as well as a method of using same. The die lubricant source supplies a plurality of short bursts of a metered amount of a selected die lubricant to a feedtube bore extending through the feedtube. The feedtube bore has a feedtube bore cross-sectional area. The nozzle assembly is for delivering and atomizing the plurality of bursts of the metered amount of the selected die lubricant so that substantially none of the selected die lubricant drips from the nozzle assembly following each one of the bursts of the metered amount of the selected die lubricant. The nozzle assembly includes a barrel and an atomizing spray tip. The barrel has a barrel bore therethrough and this barrel bore has a barrel bore cross-sectional area being no greater than the feedtube bore cross-sectional area. The barrel bore has a barrel bore posterior end and a barrel bore anterior end. The barrel bore posterior end is in communication with the feedtube bore and receives the plurality of bursts of the metered amount of the selected die lubricant. The atomizing spray tip has a spray tip bore therethrough for delivering and atomizing the plurality of the bursts of the metered amount of the selected die lubricant. The spray tip bore is in communication with the barrel bore anterior end and receives the plurality of bursts of the metered amount of the selected die lubricant. The method comprises using the combination to atomize each burst of the metered amount of the die lubricant and to retain the die lubricant within the nozzle assembly so that substantially none of the die lubricant drips from the nozzle assembly following each burst of the metered amount of the die lubricant.

It is an object of the present invention to provide a combination including a nozzle assembly for delivering a plurality of short bursts of a metered amount of die lubricant so that substantially none of the die lubricant drips from the nozzle assembly following each one of the short bursts of the metered amount of the die lubricant through the nozzle assembly.

It is an additional object of the present invention to provide a combination including a nozzle assembly for delivering atomized short bursts of the metered amount of the die lubricant without requiring a pressurized source of air.

It is a further object of the present invention to provide a combination including a nozzle assembly having a kit of selectable barrels with each one of the barrels designed for passage of particular die lubricants therethrough.

It is a still further object of the present invention to provide a combination including a nozzle assembly having a kit of selectable atomizing spray tips with each one of the atomizing spray tips designed for delivering and atomizing particular die lubricants.

It is a still further object of the present invention to provide a method of using the combination which will eliminate the problem of rejection of the die lubricant caused by the creation of a steam barrier.

BRIEF DESCRIPTION OF THE SEVERAL VIEWS OF THE DRAWING

FIG. 1 is a diagram showing a disassembled prior art spray nozzle.

FIG. 2 is similar to FIG. 1, showing a sectional view of some parts of the prior art spray nozzle, with the sectional view being taken along a diameter of the disassembled prior art spray nozzle.

FIG. 3 is an end view of the prior art spray nozzle, taken substantially along the line 3—3 shown in FIG. 1.

FIG. 4 is a top view of the spray nozzle of the present invention mounted to a post.

FIG. 5 is a partial sectional view of a first embodiment of the spray nozzle tip of the present invention.

FIG. 6 is a partial sectional view of a second embodiment of the spray nozzle tip of the present invention.

DETAILED DESCRIPTION OF THE INVENTION

Figure 7:
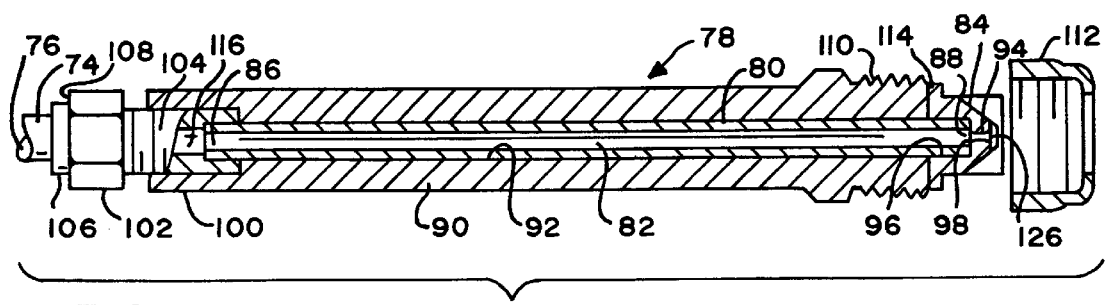
FIG. 7 is a side sectional view of the nozzle assembly of the present invention.

The present invention is best understood by differentiating it from a prior art atomizing spray nozzle and explaining the problems encountered with the prior art. Some parts of the present invention are similar to those of the prior art, and other parts are modified versions of those of the prior art.

Referring to FIGS. 1–3, a well-known prior art atomizing spray nozzle assembly 20 is shown. Although such prior art spray nozzle assemblies have long been used to spray pesticides in an agricultural setting, they have been recently used, with limited success, in airless die lubricant settings to atomize die lubricant and spray it onto a workpiece. As hereinafter described, the present invention improves on the prior art spray nozzle assembly to achieve significantly better, i.e., substantially dripless, results with better atomization of the die lubricant.

Prior art spray nozzle assembly 20 is an airless atomizing spray nozzle assembly such as that sold under the trademark UNIJET by Spraying Systems, Inc., North Ave., Wheaton, Ill. 60189-7900. Nozzle assembly 20 includes a body or housing 22, a strainer/check valve assembly 24, an atomizing spray tip 26, a spray tip retaining nut 28, and a feedtube fitting 30. Housing 22 is internally threaded at a posterior housing end 32 for threadedly receiving externally threaded feedtube fitting 30, and housing 22 is externally-threaded at an anterior housing end 34 for threadedly receiving internally-threaded retaining nut 28. Strainer/check valve assembly 24 is received into an enlarged housing bore 36 that extends longitudinally and axially through housing 22, and retaining nut 28 entrappingly sandwiches the flange 38 of strainer/check valve assembly 24 against spray tip 26 and to housing 22. Well-known strainer/check valve assembly 24 has a cylindrical screen 40 for filteringly straining the fluid passing therethrough, with screen 40 encircling a check valve (not shown) that prevents backward flow of fluid through nozzle assembly 20. It has been found that ball check valves such as the one in prior art nozzle assembly 20, in which a ball operates in opposition to a spring to rise from and reseat upon a valve seat, are prone to failure in die lubricant systems that deliver die lubricant in a series of rapid lubricant pulses because of the continuous motion of the ball onto and off of the valve seat, thereby causing weakening of the spring in the ball check valve. When the ball check valve fails, the spray nozzle becomes inoperable and the die press must be halted for maintenance, thereby reducing productivity.

Spray tip 26 is sold under the trademark TEEJET and model TP by Spraying Systems, Inc., and has a spray tip bore 42 therethrough that is not cylindrical but instead is inwardly bowed, being narrowed at the middle of the spray tip bore so as to improve atomization of the spray. Spray tip 26 can be selected with varying bore diameters as required to match the viscosity and delivery volume of die lubricant, and the tip 26 is available in planar (flat or "fan") spray patterns having spray angles of 25, 50, 80, or 100 degrees of dispersal spray pattern, as well as conical and hollow-cone spray patterns. The spray tip bore 42 is typically 0.080 inches (2.0 mm) long, and the spray tip 26 is manufactured with an enlarged axial posterior bore 44 in communication with and axially aligned with spray tip bore 42, with posterior bore 44 having a shoulder portion 46 adjacent a narrower axial interior bore 48, with bores 44, 48 being constructed during the manufacturing process of tip 26 so that spray tip bore 42 can have a controlled length of approximately 0.080 inches (2.0 mm). At the anterior end 50 of spray tip bore 42, a transverse slot 52 across spray tip bore 42, surrounded by spaced and outwardly-extending wall members 54, creates a fan dispersal pattern of the sprayed die lubricant.

Feedtube fitting 30 has a feedtube 56, preferably flexible, that is closely received and sealingly frictionally press fit into the posterior end 58 of fitting 30, and feedtube 56 leads to, and is in communication with, a source of pressurized die lubricant.

Experiments using the prior art nozzle assembly 20 to dispense short, i.e., less than 0.5 seconds and especially 100 msec. or less, bursts of precisely metered amounts of die lubricant onto a workpiece showed that the prior art nozzle assembly would drip significant amounts of lubricant in the period between successive lubricant bursts. Such sequential bursts of precisely metered amounts of die lubricant could preferably be supplied by the apparatus taught in Hayes, U.S. Pat. No. 5,531,085, issued Jul. 2, 1996, which patent is fully incorporated by reference herein. This dripping of fluid was not heretofore a problem when the prior art nozzle assembly was used in continuous spray applications such as for spraying pesticides on crops, but is a problem in applications such as spraying of sequential bursts of die lubricant on a workpiece because lubricant is wasted by dripping between the bursts and an environmental and safety hazard is created. It is believed that this dripping occurs because of, among other reasons, the enlarged cavity created within housing 22 by enlarged housing bore 36 that retains an excessive amount of lubricant therewithin. Additionally, the pressure drop experienced by the die lubricant, as it passes from the relatively narrow bore of feedtube 56 into the enlarged housing bore 36, causes a drop in lubricant velocity that reduces the atomizing capabilities of spray tip 26, thereby reducing the lubricant's ability to effectively cool and lubricate the die and workpiece. Permanent removal of the check valve assembly 24 from the nozzle assembly in an attempt to solve the problem of check valve unreliability worsens the drip problem because of the increased excess lubricant volume within the nozzle assembly, and also worsens the pressure drop problem, again because of the enlarged cavity volume. Accordingly, the present invention, hereinafter described, was developed to address these problems and thus improve upon the prior art.

Referring to FIGS. 4–12, the present invention can now be described in detail. As will be understood after the disclosure hereinafter given, there are some similarities between the present invention and the prior art nozzle shown in FIGS. 1–3, and the differences between the present invention and the prior art will be emphasized.

The combination 70 of the present invention includes a die lubricant source 72 for supplying a plurality of sequential bursts of a metered amount of a selected die lubricant, a feedtube 74 having a feedtube bore 76 therethrough in communication with die lubricant source 72 and for receiving the plurality of bursts of die lubricant therefrom, and an improved nozzle assembly 78. Such sequential bursts of precisely metered amounts of die lubricant could preferably be supplied by the apparatus taught in Hayes, U.S. Pat. No. 5,531,085, issued Jul. 2, 1996, which patent is fully incorporated by reference herein. Each one of the bursts lasts less than one half second in duration and preferably is less than 100 msec. in duration, and even more preferably each is about 30 msec. or less, and the duration of the bursts allows a precisely metered amount of lubricant to be dispensed onto a workpiece and/or die. It shall be understood that the term "workpiece", as used herein to describe the target for the die lubricant, is broadly used to encompass both the die and material being stamped by the die.

Nozzle assembly 78 includes a barrel 80 having a barrel bore 82 therethrough, and the cross-sectional area of barrel bore 82 is no greater than the feedtube bore's cross-sectional area so that no pressure drop is seen by the lubricant as it passes from the feedtube 74 toward the atomizing spray tip 84. Barrel bore 82 has a posterior end 86 and an anterior end 88, with posterior end 86 being in communication with feedtube bore 76 for receiving the plurality of bursts of the metered amount of die lubricant therefrom.

Nozzle assembly 78 further preferably includes a housing 90 having an axial housing bore 92 therethrough with barrel 80 being received within and through housing bore 92.

Nozzle assembly 78 still further includes an atomizing spray tip 84 having a spray tip bore 94 therethrough, with spray tip bore 94 having a cross-sectional area no greater than, and preferably less than, the cross-sectional area of barrel bore 82. Except for the machining of axial posterior bore 96 into spray tip 84 at the posterior end 98 of spray tip bore 94 (compare with prior art FIG. 2) at the interface with anterior end 88 with spray tip 84, spray tip 84 is substantially the same as the prior art spray tip 26 heretofore described, and it is therefore not necessary to repeat the description of the similarities between the two spray tips. As was the case with the prior art spray tip bore, the length of spray tip bore 94 is preferably 0.080 inches (2.0 mm), with the same non-cylindrical, inwardly-bowed shape so as to better atomize the lubricant passing therethrough.

It has been experimentally determined by the inventor that the ratio of the barrel bore's cross sectional area to the spray tip bore's cross sectional area must not be less than 2.5 for proper, i.e., substantially dripless, operation, and a ratio of at least 3.0 is preferred. As heretofore mentioned, the upper limit on the barrel bore's diameter is the constraint that the barrel bore's inner diameter be no greater than the inner diameter of feedtube 74 so that no decrease in pressure is seen by the lubricant passing therethrough.

Table 1, below, shows the ratios for various spray tip bore dimensions and various barrel bore dimensions.

TABLE 1

| Tip No. | Tip Bore Area | Barrel Bore Diameter | Barrel Bore Area | Barrel Area to Tip Area Ratio |
|---|---|---|---|---|
| 01 | 0.00053 sq. in. | 0.060 in. | 0.00283 sq. in. | 5.335 |
|  | 0.342 sq. mm. | 1.524 mm. | 1.824 sq. mm. |  |
| 02 | 0.001 sq. in. | 0.060 in. | 0.00283 sq. in. | 2.827 |
|  | 0.645 sq. mm. | 1.524 mm. | 1.824 sq. mm. |  |
| 03 | 0.0015 sq. in. | 0.090 in. | 0.00636 sq. in. | 4.241 |
|  | 0.968 sq. mm. | 2.286 mm. | 4.10 sq. mm. |  |
| 04 | 0.002 sq. in. | 0.090 in. | 0.00636 sq. in. | 3.181 |
|  | 1.29 sq. mm. | 2.286 mm. | 4.10 sq. mm. |  |

It has been experimentally found that barrel 80 should be at least 2 inches (50.8 mm.) long for substantial drip elimination and proper atomization of the die lubricant. Barrel 80 is preferably made of stainless steel tubing such as that manufactured by Kilsby Roberts, P.O. Box 9500, Brea, Calif. 92622.

The posterior end 100 of housing 90 is preferably internally threaded for receipt of well-known feedtube fitting 102, such as the push-lock feedtube fitting manufactured by Legris, Inc. Fitting 102 has an externally-threaded anterior end 104 for threaded insertion into posterior end 100 of housing 90, preferably using well-known thread sealant on anterior end 104 to ensure a tight seal, and fitting 102 further has a push-lock receptacle 106 on its anterior end 108 for receiving feedtube 74. As is the case with the other bores throughout the invention, the axial bore through fitting 102 is preferably no larger than the inner bore of feedtube 74 and is also preferably no smaller than the inner bore through barrel 80, so as to prevent a pressure drop of the passing lubricant.

Feedtube 74 is preferably flexible nylon or plastic having an outer diameter of 0.125 inches (3.175 mm.) and an inner bore diameter of 0.09375 inches (2.38 mm.).

Housing 90 has an externally-threaded anterior end 110 onto which is received internally-threaded retaining nut 112, substantially identical to prior art retaining nut 28 heretofore described. As retaining nut 112 is screwingly threaded onto anterior end 110 of housing 90, it retains spray tip 84 against housing 90 by engagingly entrapping lip 114 of spray tip 84.

Referring to FIGS. 5 and 6, two variations of barrel 80 are shown. FIG. 5 shows the first and preferred variation in which the axial posterior bore 96 of spray tip 84 is enlarged to closely receive the outer diameter of anterior end 88 of barrel 80, and anterior end 88 of barrel 80 is machiningly squared off to be perpendicular to the axis of barrel 80, so as to form a close and sealingly tight fit within axial posterior bore 96. Preferably, barrel 80 has an outer diameter of 0.1875 inches (4.7625 mm.) and axial posterior bore 96 into spray tip 84 has an inner diameter of 0.191 inches (4.8514 mm.). Alternatively and as shown in FIG. 6, axial posterior bore 96*a* of spray tip 84*a* could be inwardly beveled for receipt of the beveled anterior end 88*a* of barrel 80*a*, with axial posterior bore 96*a* being in communication with the posterior end 98*a* of spray tip bore 84*a*, it being understood that the suffix "a" is used here to associate similar reference numerals between the two variations shown in FIGS. 5 and 6. The posterior end of barrel 80 is similarly received into the anterior end of feedtube fitting 102.

Referring again to FIGS. 4–8, nozzle assembly 78 is assembled by placing barrel 80 through housing bore 92 with anterior end 88 of barrel 80 being received into spray tip 84, then tightening retaining nut 112 onto housing 90 and entrapping spray tip 84 to anterior end 110 of housing 90. Then, feedtube fitting 102 is screwingly inserted into posterior end 108 of housing 90 with the posterior end 86 of barrel 80 being received into the anterior end 104 of feedtube fitting 102, and fitting 102 is then torqued to a torque of 125 and 150 inch-pounds (1.44 to 1.73 meter-kg), thereby compressively sealing barrel 80 to spray tip 84 at the junction of spray tip bore 94 with anterior end 88 of barrel bore 82. If the barrel bore 82 is not tightly sealed to spray tip bore 94 and to feedtube fitting bore 116, then air will leak into the composite bores through nozzle assembly 78 that comprise the die lubricant pathway, and unwanted drip will occur. It has been experimentally found that such a tight seal is difficult, if not impossible, if barrel 80 is omitted and an attempt is instead made to seal spray tip bore 94 to (a smaller) housing bore 92, and this is one of the benefits of a replaceable barrel 80. Other benefits are also realized by having a replaceable barrel, such as ease of cleaning and, as described hereinafter, the adaptability that replaceable barrels provide for varying the size of barrel bore 82 to accommodate various viscosities of die lubricant.

Figure 8:
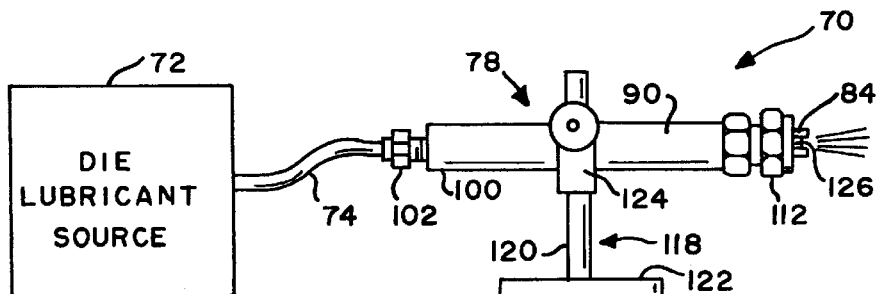
FIG. 8 is a diagrammatic view of the nozzle assembly of the present invention shown mounted to a post and supplied by a source of metered bursts of die lubricant.
Figure 9:
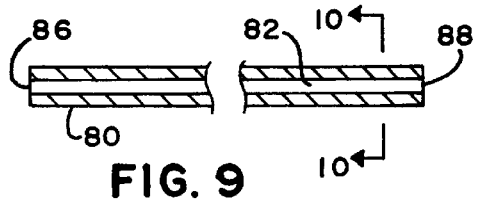
FIG. 9 is a side sectional view of a first barrel of the present invention.
Figure 10:
FIG. 10 is a transverse sectional view of the first barrel of the present invention, taken substantially along the line 10—10 shown in FIG. 9.
Figure 11:
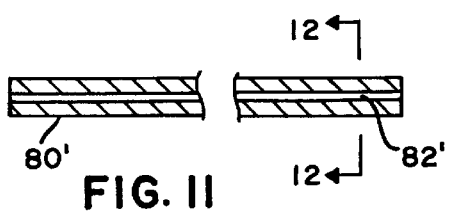
FIG. 11 is a side sectional view of a second barrel of the present invention.
Figure 12:
FIG. 12 is a transverse sectional view of the second barrel of the present invention, taken substantially along the line 12—12 shown in FIG. 11.

As shown in FIGS. 4 and 8, nozzle assembly 78 may be mounted to a stand 118 as, for example, by securing nozzle assembly 78 to a post 120 that extends upwardly from a magnetic base 122 of stand 118 using a well-known clamp 124 such as the Gem two-post swivel clamp manufactured by GEM instruments, 2832 Nationwide Parkway, Brunswick, Ohio 44212, thereby allowing the nozzle assembly 78 to swivel and be oriented as desired toward a workpiece.

Different die lubricant applications and performance requirements have differing requirements for the viscosity of the die lubricant itself. Changes in lubricant viscosity can affect the die lubricant application process by affecting the pressure required to push the die lubricant through fixed-size passageways, with more viscous lubricants requiring higher pressure for a fixed size passageway. Accordingly, it is desirable to have the flexibility to vary the passageway size through the barrel to accommodate varying spray tip bore sizes while still ensuring a dripless system by the ratio of the spray tip bore cross-sectional area to the barrel bore cross-sectional area, as hereinbefore described.

Accordingly, the present invention provides a barrel kit of varying barrel bore sizes, with larger barrel bores being for more viscous die lubricants. As shown in FIGS. 9–12, barrel 80 could be chosen from this barrel kit and having a first barrel bore 82 cross-sectional area, or a barrel 80' could instead be chosen from this barrel kit, with barrel 80' having a smaller second barrel bore 82' cross-sectional area. Likewise, a spray tip kit may be provided including, for example, a plurality of atomizing spray tips as shown in Table 1, with each spray tip having a different spray tip bore cross-sectional area, and with each spray tip being associated with at least one of the plurality of barrel kit barrels and selected so that the hereinbefore-described constraint of the ratio of the spray tip bore cross-sectional area to the barrel bore cross-sectional area is met and so that the barrel bore's cross sectional area of the selected barrel from the barrel kit is no larger than the cross-sectional area of the feedtube bore and feedtube fitting bore. All barrels of the barrel kit preferably have the same outer diameter for receipt within housing bore 92, thereby allowing the barrel bore cross-sectional area to be easily changed to accommodate changes in the spray tip bore for changes in lubricant viscosity.

Again and as heretofore described, it is most highly preferable that there be no increase in cross-sectional passageway areas from the lubricant supply source to the spray tip bore so that there is no pressure drop seen by the lubricant until the instant of atomization with emergence from the anterior end 126 of the spray tip bore as the lubricant flies from the spray tip to the workpiece, thereby causing the lubricant velocity to increase as the lubricant passes from the source to the spray tip bore.

The replaceability of the barrel and spray tip also allows the barrel, feedtube, and spray tip to be quickly replaced when changing from one lubricant to another. Some lubricants are known to chemically interact with each other and clog the spray nozzle. The present invention's ease of interchangeability of spray tips and barrels permits quick changeover from one lubricant to another without clogging, thereby reducing down time of the die press.

To use the nozzle assembly and combination of the present invention, the preferred method is, for each burst of lubricant, (a) to create the burst of the metered amount of the selected die lubricant having a chosen viscosity, with the burst of the metered amount of the selected die lubricant lasting less than one half second in duration, preferably less than 100 msec. in duration and still more preferably being less than about 30 msec. in duration, then (b) transferring the burst of the metered amount of the selected die lubricant into the feedtube bore as by using the apparatus described in Hayes, U.S. Pat. No. 5,531,085, then (c) transferring the burst of the metered amount of the selected die lubricant from the feedtube bore into the barrel bore's posterior end; then (d) transferring the burst of the metered amount of the selected die lubricant from the barrel bore's anterior end to the spray tip bore; then (e) delivering and atomizing the burst of the metered amount of the selected die lubricant from the spray tip bore onto a workpiece; and then (f) retaining unatomized die lubricant within the nozzle assembly so that substantially none of the selected die lubricant drips from said nozzle assembly following the burst of the metered amount of the selected die lubricant. Each one of the bursts of die lubricant preferably has a pressure of less than about 151 pounds per square inch; if a greater pressure is used, excessive lubricant will splatter, splash, and reflect from the workpiece, thereby creating an environmental and safety hazard.

The method of using the present invention also preferably includes the additional step, between delivering and atomizing a previous burst and a successive burst of lubricant, of allowing a steam barrier, created by contact of the previous burst with the heated workpiece, to dissipate, thereby allowing successive bursts to reach the workpiece without repulsion.

Although the present invention has been described and illustrated with respect to a preferred embodiment and a preferred use therefor, it is not to be so limited since modifications and changes can be made therein which are within the full intended scope of the invention.

I claim:

1. In combination:
   (a) a die lubricant source for supplying a plurality of bursts of a metered amount of a selected die lubricant, each one of the bursts lasting less than one half second in duration;
   (b) a feedtube having a feedtube bore extending therethrough, said feedtube bore having a feedtube bore cross-sectional area, said feedtube bore communicating with said die lubricant source for receiving the plurality of bursts of the metered amount of the selected die lubricant; and
   (c) a nozzle assembly comprising:
      i. a barrel having a barrel bore therethrough, said barrel bore having a barrel bore cross-sectional area being no greater than said feedtube bore cross-sectional area, said barrel bore having a barrel bore posterior end and a barrel bore anterior end, said barrel bore posterior end being in communication with said feedtube bore for receiving the plurality of bursts of the metered amount of the selected die lubricant; and
      ii. an atomizing spray tip having a spray tip bore therethrough, said spray tip bore having a spray tip bore cross-sectional area being no greater than said barrel bore cross-sectional area, said spray tip bore having a spray tip bore posterior end being in communication with said barrel bore anterior end for receiving the plurality of bursts of the metered amount of the selected die lubricant, and said spray tip bore having a spray tip bore anterior end for delivering and atomizing the plurality of bursts of the metered amount of the selected die lubricant so that substantially none of the selected die lubricant drips from said spray tip bore anterior end following the each one of the bursts of the metered amount of the selected die lubricant;
   said barrel bore cross-sectional area divided by said spray tip bore cross-sectional area being not less than 2.5.

2. In combination:
   (a) a die lubricant source for supplying a plurality of bursts of a metered amount of a selected die lubricant, each one of the bursts lasting less than one half second in duration;
   (b) a feedtube having a feedtube bore extending therethrough, said feedtube bore having a feedtube bore cross-sectional area, said feedtube bore communicating with said die lubricant source for receiving the plurality of bursts of the metered amount of the selected die lubricant; and
   (c) a nozzle assembly comprising:
      i. a barrel having a barrel bore therethrough, said barrel bore having a barrel bore cross-sectional area being no greater than said feedtube bore cross-sectional area, said barrel bore having a barrel bore posterior end and a barrel bore anterior end, said barrel bore posterior end being in communication with said feedtube bore for receiving the plurality of bursts of the metered amount of the selected die lubricant;
      ii. an atomizing spray tip having a spray tip bore therethrough, said spray tip bore having a spray tip bore cross-sectional area being no greater than said barrel bore cross-sectional area, said spray tip bore having a spray tip bore posterior end being in communication with said barrel bore anterior end for receiving the plurality of bursts of the metered amount of the selected die lubricant, and said spray tip bore having a spray tip bore anterior end for delivering and atomizing the plurality of bursts of the metered amount of the selected die lubricant so that substantially none of the selected die lubricant drips from said spray tip bore anterior end following the each one of the bursts of the metered amount of the selected die lubricant; and
      iii. a barrel kit, said barrel kit including a plurality of barrel kit barrels, each one of said plurality of said barrel kit barrels having a respective barrel bore therethrough, each one of said respective barrel bores having a barrel bore cross-sectional area that is no greater than said feedtube bore cross-sectional area, said each one of said respective barrel bores having a barrel bore posterior end and a barrel bore anterior end; with said barrel being selected from said barrel kit.

3. The combination as recited in claim 2, in which each said barrel bore cross-sectional area is less than said feedtube bore cross-sectional area, and said spray tip bore cross-sectional area is less than each said barrel bore cross-sectional area.

4. The combination as recited in claim 2, in which each respective said barrel bore cross-sectional area divided by said spray tip bore cross-sectional area is not less than 2.5.

5. The combination as recited in claim 2, in which said nozzle assembly further comprises a spray tip kit, said spray tip kit including a plurality of spray tip kit atomizing spray tips, each one of said plurality of said spray tip kit atomizing spray tips having a respective spray tip bore therethrough, each one of said respective spray tip bores having a spray tip bore cross-sectional area, said each one of said plurality of said spray tip kit atomizing spray tips being associated with at least one of said plurality of barrel kit barrels, each said respective spray tip bore cross-sectional area being no greater than said barrel bore cross-sectional area of said barrel kit barrel associated with said spray tip kit atomizing spray tip; and with said atomizing spray tip being selected from said spray tip kit.

6. The combination as recited in claim 5, in which each said barrel bore cross-sectional area is less than said feedtube bore cross-sectional area, and each said respective spray tip bore cross-sectional area is less than said barrel bore cross-sectional area of said barrel kit barrel associated with said spray tip kit atomizing spray tip.

7. The combination as recited in claim 5, in which said barrel bore cross-sectional area, of said barrel kit barrel that is associated with said spray tip kit atomizing spray tip, divided by said respective spray tip bore cross-sectional area, is not less than 2.5.

8. A method of using a combination, said combination comprising:
   (a) a die lubricant source for supplying a plurality of bursts of a metered amount of a selected die lubricant, each one of the bursts lasting less than one half second in duration;
   (b) a feedtube having a feedtube bore extending therethrough, said feedtube bore having a feedtube bore cross-sectional area, said feedtube bore communicating with said die lubricant source for receiving the plurality of bursts of the metered amount of the selected die lubricant; and
   (c) a nozzle assembly comprising:
      i. a barrel having a barrel bore therethrough, said barrel bore having a barrel bore cross-sectional area being no greater than said feedtube bore cross-sectional area, said barrel bore having a barrel bore posterior end and a barrel bore anterior end, said barrel bore posterior end being in communication with said feedtube bore for receiving the plurality of bursts of the metered amount of the selected die lubricant; and ii. an atomizing spray tip having a spray tip bore therethrough, said spray tip bore having a spray tip bore cross-sectional area being no greater than said barrel bore cross-sectional area, said spray tip bore having a spray tip bore posterior end being in communication with said barrel bore anterior end for receiving the plurality of bursts of the metered amount of the selected die lubricant, and said spray tip bore having a spray tip bore anterior end for delivering and atomizing the plurality of bursts of the metered amount of the selected die lubricant so that substantially none of the selected die lubricant drips from said spray tip bore anterior end following the each one of the bursts of the metered amount of the selected die lubricant;

said method comprising, for each one of the bursts, the steps of:

(a) creating the burst of the metered amount of the selected die lubricant, the burst of the metered amount of the selected die lubricant lasting less than one half second in duration;

(b) then transferring the burst of the metered amount of the selected die lubricant into said feedtube bore;

(c) then transferring the burst of the metered amount of the selected die lubricant from said feedtube bore into said barrel bore posterior end;

(d) then transferring the burst of the metered amount of the selected die lubricant from said barrel bore anterior end to said spray tip bore;

(e) then delivering and atomizing the burst of the metered amount of the selected die lubricant from said spray tip bore onto a workpiece; and (f) then retaining the selected die lubricant within said nozzle assembly so that substantially none of the selected die lubricant drips from said nozzle assembly following the burst of the metered amount of the selected die lubricant;

said method further comprising, between delivering and atomizing a previous burst and a successive burst of the metered amount of the selected die lubricant, the additional step of allowing a steam barrier, created by contact of the previous burst with the workpiece, to dissipate.

9. In combination:

(a) a die lubricant source for supplying a plurality of bursts of a metered amount of a selected die lubricant, each one of the bursts lasting less than one half second in duration;

(b) a feedtube having a feedtube bore extending therethrough, said feedtube bore having a feedtube bore cross-sectional area, said feedtube bore communicating with said die lubricant source for receiving the plurality of bursts of the metered amount of the selected die lubricant; and (c) a nozzle assembly comprising:

i. a barrel having a barrel bore therethrough, said barrel bore having a barrel bore cross-sectional area being less than said feedtube bore cross-sectional area, said barrel bore having a barrel bore posterior end and a barrel bore anterior end, said barrel bore posterior end being in communication with said feedtube bore for receiving the plurality of bursts of the metered amount of the selected die lubricant;

ii. a barrel kit including a plurality of barrel kit barrels, each one of said plurality of said barrel kit barrels having a barrel bore therethrough, each one of said barrel bores respectively having it's own barrel bore cross-sectional area being less than said feedtube bore cross-sectional area, said each one of said barrel bores respectively having a barrel bore posterior end and a barrel bore anterior end; and said barrel being selected from said barrel kit;

iii. an atomizing spray tip having a spray tip bore therethrough, said spray tip bore having a spray tip bore cross-sectional area being no greater than said barrel bore cross-sectional area, said spray tip bore having a spray tip bore posterior end being in communication with said barrel bore anterior end for receiving the plurality of bursts of the metered amount of the selected die lubricant, and said spray tip bore having a spray tip bore anterior end for delivering and atomizing the plurality of bursts of the metered amount of the selected die lubricant so that substantially none of the selected die lubricant drips from said spray tip bore anterior end following the each one of the bursts of the metered amount of the selected die lubricant; and iv. a spray tip kit including a plurality of spray tip kit atomizing spray tips, each one of said plurality of said spray tip kit atomizing spray tips respectively having a spray tip bore therethrough, each one of said spray tip bores respectively having it's own spray tip bore cross-sectional area, said each one of said plurality of said spray tip kit atomizing spray tips being associated with at least one of said plurality of barrel kit barrels, each said respective spray tip bore cross-sectional area being no greater than approximately one third of said barrel bore cross-sectional area of said barrel kit barrel associated with said spray tip kit atomizing spray tip; said atomizing spray tip being selected from said spray tip kit.

10. In combination, (a) a die lubricant source for supplying a plurality of bursts of a metered amount of a die lubricant, each one of the bursts lasting less than one half second in duration;

(b) a feedtube having a feedtube bore extending therethrough, said feedtube bore having a feedtube bore cross-sectional area, said feedtube bore communicating with said die lubricant source for receiving the plurality of bursts of the metered amount of the die lubricant; and (c) a nozzle assembly comprising:

i. a housing, said housing having a housing bore therethrough;

ii. a barrel received within said housing bore, said barrel having a barrel bore therethrough, said barrel bore having a barrel bore cross-sectional area being no greater than said feedtube bore cross-sectional area, said barrel bore having a barrel bore posterior end and a barrel bore anterior end, said barrel bore posterior end being in communication with said feedtube bore for receiving the plurality of bursts of the metered amount of the die lubricant;

iii. an atomizing spray tip having a spray tip bore therethrough, said spray tip bore having a spray tip bore cross-sectional area with said barrel bore cross-sectional area divided by said spray tip bore cross-sectional area being no less than 2.5, said spray tip bore having a spray tip bore posterior end being in communication with said barrel bore anterior end for receiving the plurality of bursts of the metered amount of the die lubricant, said spray tip bore having a spray tip bore anterior end for delivering and atomizing the plurality of bursts of the metered amount of the die lubricant, said feedtube bore, said barrel bore, and said spray tip bore being sequentially in leakless communication with each other.

11. The combination as recited in claim 10, in which said barrel is compressively sealed to said spray tip at the junction of said spray tip bore posterior end with said barrel bore anterior end.

\* \* \* \* \*